(12) United States Patent
Spiridon et al.

(10) Patent No.: US 8,289,731 B2
(45) Date of Patent: Oct. 16, 2012

(54) CONVERTER CONTROLLER

(75) Inventors: Constantin Spiridon, San Jose, CA (US); Dan Simion, Santa Clara, CA (US); Eftimie Caraghiorghiopol, San Jose, CA (US)

(73) Assignee: O2Micro Inc., Santa Clara, CA (US)

( * ) Notice: Subject to any disclaimer, the term of this patent is extended or adjusted under 35 U.S.C. 154(b) by 373 days.

(21) Appl. No.: 11/810,472

(22) Filed: Jun. 5, 2007

(65) Prior Publication Data
US 2008/0304293 A1    Dec. 11, 2008

(51) Int. Cl.
*H02M 3/335* (2006.01)
*H02M 3/338* (2006.01)
*G05F 1/30* (2006.01)

(52) U.S. Cl. .................. 363/21.12; 363/21.16; 323/288

(58) Field of Classification Search ............... 363/21.12, 363/21.16, 21.17, 21.18, 97, 131; 323/222, 323/288
See application file for complete search history.

(56) References Cited

U.S. PATENT DOCUMENTS

| | | | |
|---|---|---|---|
| 4,245,286 A * | 1/1981 | Paulkovich et al. | 363/21.11 |
| 6,130,826 A | 10/2000 | Matsumoto | |
| 6,333,624 B1 * | 12/2001 | Ball et al. | 323/284 |
| 6,987,675 B2 * | 1/2006 | Jovanovic et al. | 363/21.01 |
| 7,016,204 B2 * | 3/2006 | Yang et al. | 363/21.13 |
| 7,447,049 B2 * | 11/2008 | Garner et al. | 363/21.12 |
| 2006/0176716 A1 | 8/2006 | Balakrishnan et al. | |
| 2007/0041224 A1 * | 2/2007 | Moyse et al. | 363/21.01 |

FOREIGN PATENT DOCUMENTS

| | | |
|---|---|---|
| CN | 1592056 A | 3/2005 |
| JP | 2003244953 | 8/2003 |

* cited by examiner

*Primary Examiner* — Gary L Laxton
*Assistant Examiner* — Nusrat Quddus

(57) ABSTRACT

A converter controller is disclosed. In one embodiment, a controller for a flyback converter includes a converter and a flyback controller. The converter is coupled to the flyback converter for receiving an auxiliary voltage and for generating a constant power voltage. The flyback controller is powered by the constant power voltage for controlling an output voltage of the flyback converter. Furthermore, the flyback converter comprises a transformer with a primary side and a secondary side. The output voltage and the auxiliary voltage are produced at the transformer.

14 Claims, 5 Drawing Sheets

CONVERTER CONTROLLER

TECHNICAL FIELD

The present invention relates to power conversion devices, and more particularly to power conversion controllers.

BACKGROUND ART

Power conversion devices are currently widely used in electronic systems for providing regulated power supplies. There exists a variety of power conversion devices, such as a buck converter, a boost converter, and a flyback converter. Typically, a power conversion device operates under control of a converter controller to obtain a desired output voltage. The converter controller can be powered by a separate switch mode power supply (SMPS) with the benefit of a stable power voltage. However, the SMPS solution requires additional circuitry, and consequently the cost is increased significantly while the system efficiency degrades.

FIG. 1 illustrates a block diagram of a conventional controller 100, which is integrated with a power supply circuit. As an example, a flyback converter 102 is used in FIG. 1 for the purpose of explanation but not limitation. Generally, a flyback converter 102 includes a switch 140, a transformer T1 with a primary winding 103 at the primary side and a secondary winding 105 at the secondary side, a diode 109 and a capacitor 111. When the switch 140 is turned on, a current flowing through the primary winding 103 ramps up and energy from a power source 101 is stored in the core of the transformer T1. During this time interval, the diode 109 is reverse-biased and energy to a load 113 is supplied by the charge in the capacitor 111. When the switch 140 is turned off, the negative current transition on the primary winding 103 is reflected to the secondary winding 105 such that the diode 109 becomes forward-biased and current is conducted to the load 113 and also to recharge the capacitor 111. In general, the flyback converter 102 is an isolated power converter for converting an input voltage $V_{IN}$ to an output voltage $V_{OUT}$.

The controller 100 is employed to control a conduction status of the switch 140, thereby controlling the output voltage $V_{OUT}$. Instead of being powered by a separate SMPS, a flyback controller 120 is powered by an auxiliary voltage $V_{AUX}$ derived from the flyback converter 102. The auxiliary voltage $V_{AUX}$ is generated by an auxiliary winding 107. The auxiliary winding 107 may be placed at the secondary side of the transformer T1. As such, the auxiliary winding 107 is magnetically coupled to the transformer T1. The auxiliary winding 107 is further coupled to a diode 115 and a capacitor 117. In a similar way, the secondary winding 105 is coupled to the diode 109 and the capacitor 111. Furthermore, the auxiliary winding 107 and the secondary winding 105 are differently grounded. For example, the secondary winding 105 is coupled to a secondary side ground 121, while the auxiliary winding 107 is coupled to a primary side ground 123. As the switch 140 is turned on and off alternately, the auxiliary voltage $V_{AUX}$ is produced at the secondary side of the transformer T1. Additionally, by adjusting a turn ratio between the primary winding 103 and the auxiliary winding 107, the auxiliary voltage $V_{AUX}$ can achieve a desired voltage level to power the flyback controller 120.

However, the auxiliary voltage $V_{AUX}$ will vary according to the load condition (e.g., a light load condition or a heavy load condition) and thus a large ripple will appear on the power supply of the flyback controller 120. For example, the auxiliary voltage $V_{AUX}$ may vary from 3.5V to 15V. A typical flyback controller needs a minimum power voltage of 6V. As a result, the power voltage (which is herein the auxiliary voltage $V_{AUX}$) may drop below the minimum supply voltage of 6V required by the flyback controller 120, leading to a power failure. One approach to avoiding such power failure is to increase the number of turns of the auxiliary winding 107 such that the minimum auxiliary voltage $V_{AUX}$ is guaranteed to be greater than the minimum power voltage required by the flyback controller 120 when the auxiliary voltage $V_{AUX}$ varies according to the load condition. However, one drawback of such an approach is that the maximum auxiliary voltage $V_{AUX}$ may exceed the maximum power voltage that the flyback controller 120 can endure.

Therefore, conventional solutions to controller power supply have either cost concerns or stability problems.

SUMMARY

In one embodiment, a controller for a flyback converter is provided. The controller includes a converter and a flyback controller. The converter is coupled to the flyback converter for receiving an auxiliary voltage and for generating a constant power voltage. The flyback controller is powered by the constant power voltage for controlling an output voltage of the flyback converter. Furthermore, the flyback converter comprises a transformer with a primary side and a secondary side. The output voltage and the auxiliary voltage are produced at the transformer.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
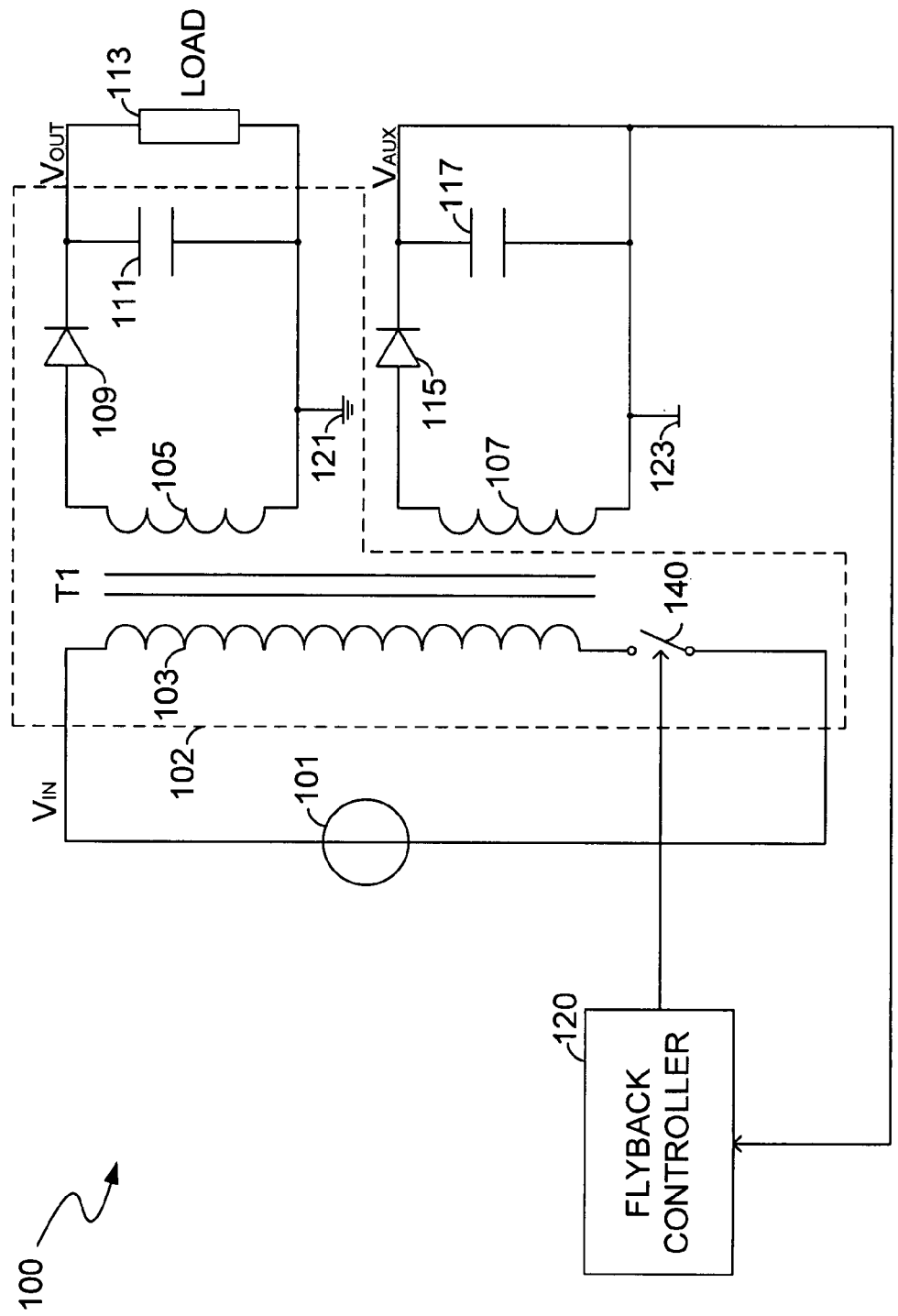
FIG. 1 is a block diagram of a conventional controller.
Figure 2:
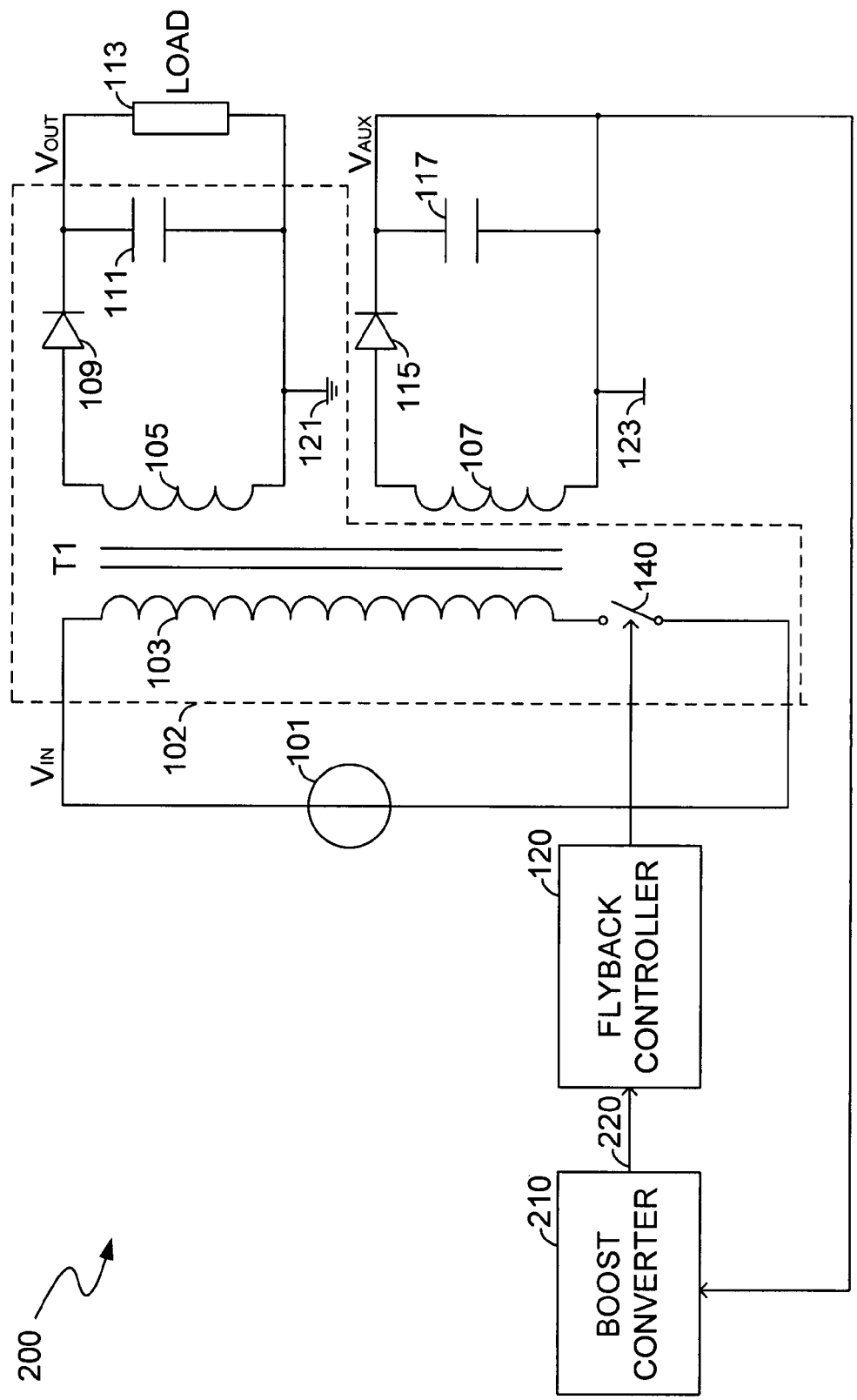
FIG. 2 is a block diagram of a controller according to one embodiment of the present invention.

FIG. 2 illustrates a block diagram of a controller 200 according to one embodiment of the present invention. Elements labeled the same in FIG. 1 have similar functions and will not be repetitively described herein for purposes of brevity and clarity. In the controller 200, a converter 210, e.g., a boost converter, is employed to convert the auxiliary voltage $V_{AUX}$ to a constant power voltage 220. Regardless of $V_{AUX}$ variation caused by the load condition, the boost converter 210 can maintain the constant power voltage 220 at a predetermined voltage level. For example, though the auxiliary voltage $V_{AUX}$ varies from 3.5V to 15V, the constant power voltage 220 can be maintained at 15V. The constant power voltage 220 is used to power the flyback controller 120. In one embodiment, the voltage level of the constant power voltage 220 can be predetermined to meet power supply requirements of the flyback controller 120. As such, the power voltage of the flyback controller 120 is guaranteed to be greater than the required minimum power voltage. In other words, regardless of the variations in load condition, the controller 200 can operate properly without power failure.

Additionally, a number of different types of converters may be utilized to generate the constant power voltage based on the auxiliary voltage $V_{AUX}$. For example, a buck-boost converter may replace the boost converter 210 to perform the functionality described herein. Also, the controller 200 described herein may be applied to various converters, not limited to the flyback converter 102. For example, the controller 200 may be applied to a forward converter in a similar way.

Figure 3:
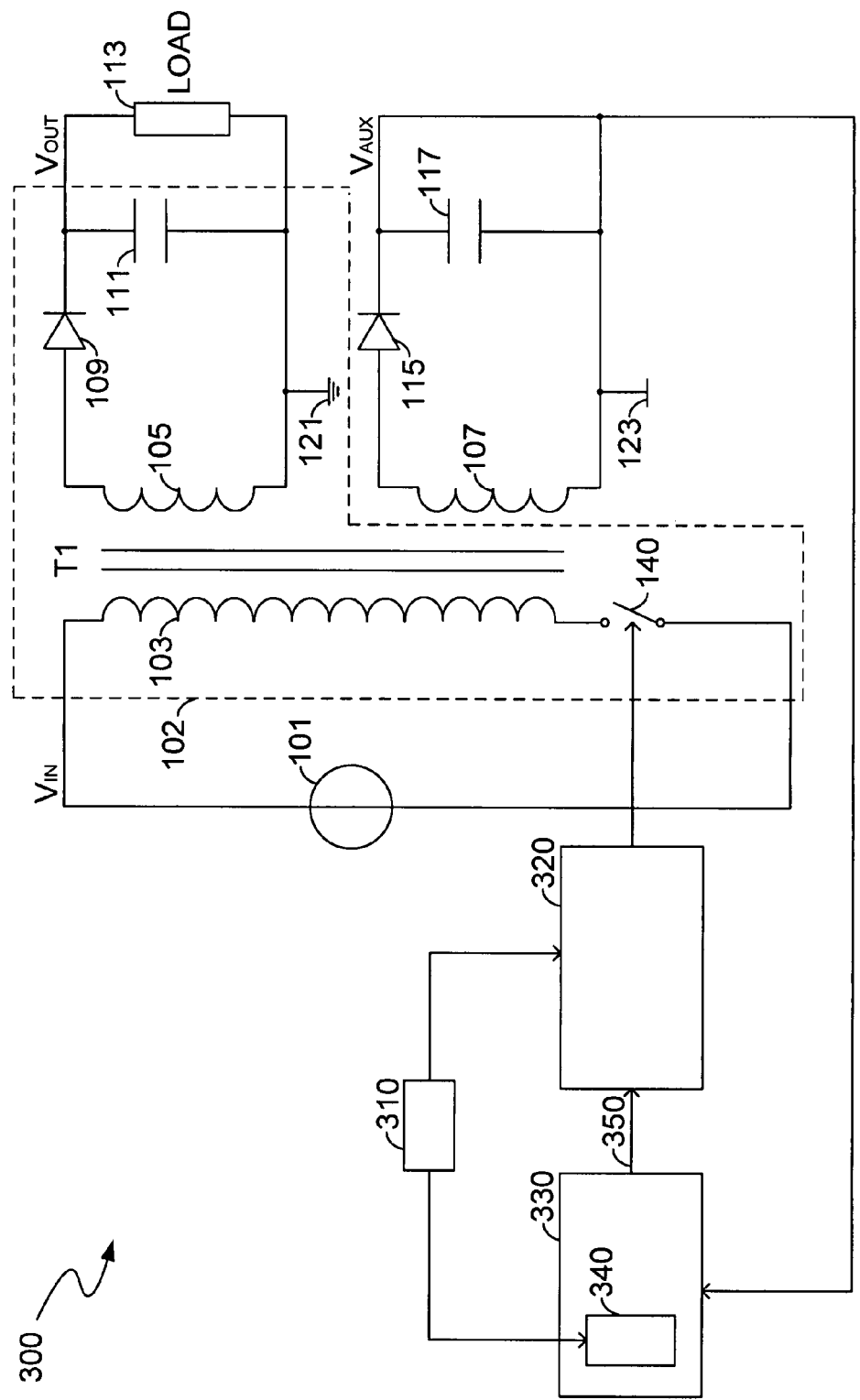
FIG. 3 is a block diagram of a controller according to another embodiment of the present invention.

FIG. 3 illustrates a block diagram of a controller 300 according to another embodiment of the present invention. Elements labeled the same in FIGS. 1 and 2 have similar functions and will not be repetitively described herein for purposes of brevity and clarity. Similarly to FIG. 2, the controller 300 includes a boost converter 330 and a flyback controller 320. The boost converter 330 receives the auxiliary voltage $V_{AUX}$ and generates a constant power voltage 350. Powered by the constant power voltage 350, the flyback controller 320 controls the conduction status of the switch 140, thereby controlling the output voltage $V_{OUT}$ of the flyback converter 102. The boost converter 330 further includes a boost controller 340. The boost controller 340 and the flyback controller 320 are herein reconfigured to share common components, e.g., a time base generator 310, thereby achieving cost saving and power efficiency. As such, the boost controller 340 and the flyback controller 320 can be built into a single chip.

Figure 4:
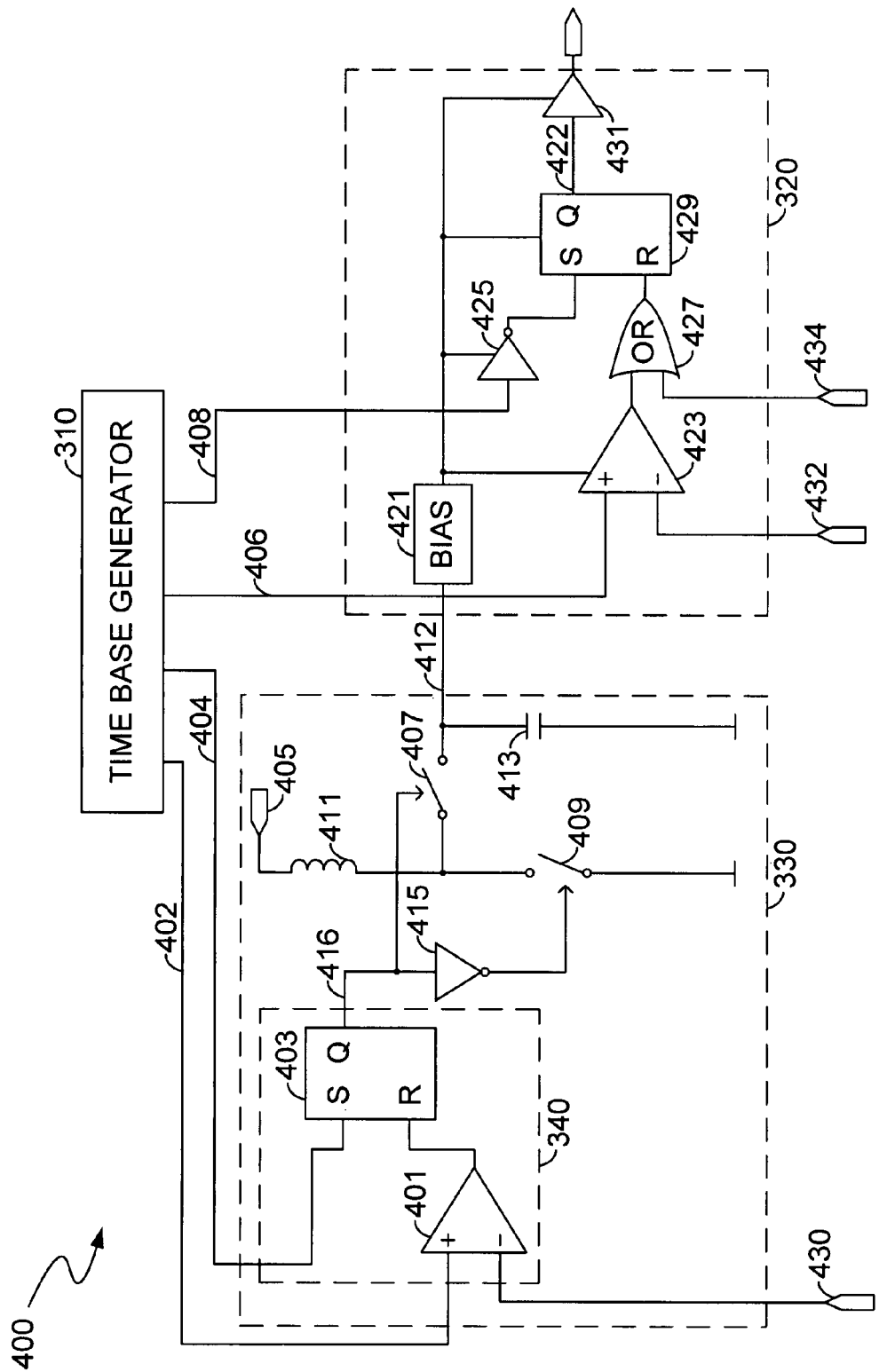
FIG. 4 is a schematic diagram of a controller according to one embodiment of the present invention.

FIG. 4 illustrates a schematic diagram of a controller 400 according to one embodiment of the present invention. Elements labeled the same in FIG. 3 have similar functions and will not be repetitively described herein for purposes of brevity and clarity. Similarly to FIG. 3, the controller 400 in FIG. 4 includes the time base generator 310, the boost converter 330 with the boost controller 340, and the flyback controller 320. The boost controller 340 may further include a comparator 401 and a flip-flop 403. The boost converter 330 may further include a first switch 407, a second switch 409, an inductor 411 and a capacitor 413. The flyback controller 320 may further include a bias circuit 421, a comparator 423 and a flip-flop 429.

The time base generator 310 can generate a plurality of ramp signals and a plurality of clock signals. The plurality of ramps signals include a first ramp signal 402 having a first frequency and a second ramp signal 406 having a second frequency, respectively provided to the boost controller 340 and the flyback controller 320. Similarly, the plurality of clock signals include a first clock signal 404 having the first frequency and a second clock signal 408 having the second frequency, respectively provided to the boost controller 340 and the flyback controller 320. As such, the first frequency of the first ramp signal 402 and the first clock signal 404 is equal to a frequency $f_{340}$ of the boost controller 340, and the second frequency of the second ramp signal 406 and the second clock signal 408 is equal to a frequency $f_{320}$ of the flyback controller 320. In one embodiment, the frequency $f_{340}$ is greater than the frequency $f_{320}$, e.g., the frequency $f_{340}$ is equal to 500 KHz and the frequency $f_{320}$ is equal to 100 KHz.

The first ramp signal 402 and the first clock signal 404 are utilized by the converter controller 340 to generate a control signal 416. To this end, the comparator 401 compares the first ramp signal 402 with a first reference signal 430. Furthermore, a result of the comparing is received by the flip-flop 403 at a reset terminal (R), and the first clock signal 404 is received by the flip-flop 403 at a set terminal (S). According to the received signals, the flip-flop 403 generates the control signal 416. Specifically, if the first ramp signal 402 is less than the first reference signal 430, the output of the comparator 401 is logic low such that the control signal 406 is set to be logic high according to the first clock signal 404. In contrast, if the first ramp signal 402 is greater than the first reference signal 430, the output of the comparator 401 is logic high such that the control signal is reset to be logic low accordingly.

The control signal 416 provided by the boost controller 340 is utilized to control the conduction status of the first and second switches 407 and 409, such that the boost converter 330 can convert a variable input voltage 405 to a constant power voltage 412. For example, when the control signal 416 is logic low, the first switch 407 is turned off and the second switch 409 is turned on. In this instance, the boost converter 330 operates in an ON-STATE time interval TON. In contrast, when the control signal 416 is logic high, the first switch 407 is turned on and the second switch 409 is turned off. In this instance, the boost converter 330 operates in an OFF-STATE time interval TOFF. A duty ratio D of the boost converter 330 is given by $$D = \frac{TON}{TON + TOFF} \quad (1)$$

Furthermore, the constant power voltage 412 can be given by $$\frac{V_o}{V_i} = \frac{1}{1-D} \quad (2)$$

where $V_o$ is defined as the constant power voltage 412 and $V_i$ is defined as the input voltage 405.

In one embodiment, the auxiliary voltage $V_{AUX}$ produced at the secondary side of the transformer T1 in FIG. 3 is input into the boost converter 330 and converted into the constant power voltage 412 in FIG. 4. Specifically, during the ON-STATE time interval TON of the boost converter 330, a current of the inductor 411 ramps up and energy is transferred from the auxiliary voltage $V_{AUX}$ into the inductor 411. During the OFF-STATE time interval TOFF of the boost converter 330, the energy accumulated in the inductor 411 is transferred into the capacitor 413. By adjusting the duty ratio D dynamically under control of the boost controller 340, the constant power voltage 412 is obtained.

Due to the constant power voltage 412, reliability and stability of the flyback controller 320 can be maintained. Additionally, components within the flyback controller 320 may require various power supplies. Therefore, the bias circuit 421 is employed for generating a plurality of power supplies based on the constant power voltage 412 in one embodiment. When powered up, the comparator 423 compares the second ramp signal 406 with a second reference signal 432. Furthermore, a result of the comparing is received by the flip-flop 429 at a reset terminal (R), and the second clock signal 408 is received by the flip-flop 429 at a set terminal (S). In one embodiment, the logic level of the second clock signal 408 may be reversed by an inverter 425 before being received by the flip-flop 429. Additionally, a current sensing signal 434 may be coupled to the reset terminal of the flip-flop 429 via an OR gate 427. The current sensing signal 434 indicates a current condition at the primary side of the transformer T1, e.g., an over current condition. According to the received signals, the flip-flop 429 generates a switch control signal 422. In one embodiment, the switch control signal 422 may be coupled to the switch 140 in FIG. 3 via a buffer 431. As previously illustrated, the switch control signal 422 controls the conduction status of the switch 140, thereby controlling the output voltage $V_{OUT}$ of the flyback converter 102.

Figure 5:
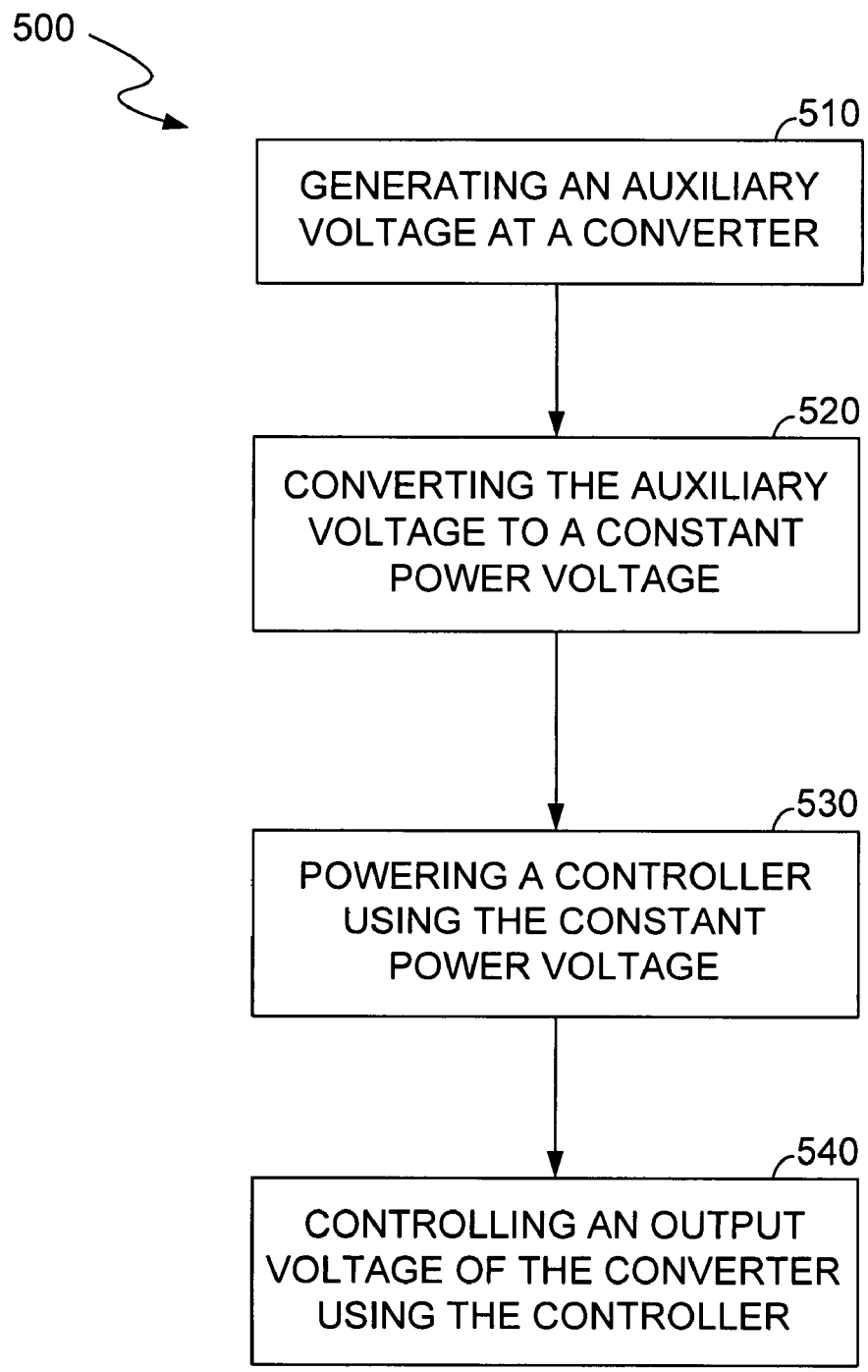
FIG. 5 is a flow chart of a method for controlling a converter according to one embodiment of the present invention.

FIG. 5 is a flow chart 500 of a method for controlling a converter. Although specific steps are disclosed in FIG. 5, such steps are exemplary. That is, the present invention is well suited to performing various other steps or variations of the steps recited in FIG. 5.

In block 510, an auxiliary voltage is produced at a converter. In one embodiment, the auxiliary voltage is generated by an auxiliary winding magnetically coupled to a transformer in a flyback converter. In block 520, the auxiliary voltage is converted into a constant power voltage. In one embodiment, a boost converter can be used to realize such power conversion. In block 530, a controller is powered up reliably by the constant power voltage. In block 540, the controller further controls an output voltage of the converter.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A controller for a flyback converter, comprising:
a first converter coupled to said flyback converter and operable for receiving an auxiliary voltage from an auxiliary winding of a transformer and for generating a constant power voltage that is output to a flyback controller, wherein a secondary winding of said transformer is coupled to a load, and wherein said auxiliary voltage received by said first converter varies according to a load condition and said constant power voltage provided by said first converter to said flyback controller is constant independent of said load condition;
said flyback controller coupled to said first converter, wherein said flyback controller is powered on by said constant power voltage and operable for controlling an output voltage of said flyback converter at said secondary winding of said transformer; and
a single time base generator coupled to both said first converter and said flyback controller and operable for providing ramp signals to said first converter and said first flyback controller and clock signals to said first converter and said flyback controller.

2. A method for controlling a converter, comprising:
producing an auxiliary voltage at an auxiliary winding of a transformer which is variable according to the condition of a load coupled to a secondary winding of said transformer;
generating a first ramp signal, a second ramp signal, a first clock signal, and a second clock signal at a single time base generator at the same time;
converting said auxiliary voltage to a constant power voltage which keeps constant independent of the load condition;
controlling said constant power voltage based upon said first ramp signal and said first clock signal;
powering on a controller using said constant power voltage; and
controlling an output voltage of said converter at said secondary winding of said transformer using said controller based upon said second ramp signal and said clock signal.

3. A circuit comprising:
a transformer for transforming an input voltage to an output voltage and for providing said output voltage to a load;
an auxiliary winding magnetically coupled to said transformer and operable for generating an auxiliary voltage at a secondary side of said transformer which varies with the load condition;
a converter coupled to said auxiliary winding and operable for receiving said auxiliary voltage and for converting said auxiliary voltage to a constant power voltage which keeps constant independent of the load condition;
a controller powered on by said constant power voltage and operable for controlling said output voltage of said transformer; and
a single time base generator coupled to said converter and said controller and operable to for providing a first ramp signal and a first clock signal to said converter and for providing a second ramp signal and a second clock signal to said controller.

4. The controller of claim 1, wherein said first converter is a boost converter.

5. The controller of claim 1, wherein said auxiliary voltage is produced at a secondary side of said transformer.

6. The controller of claim 1, further comprising:
a bias circuit coupled between said first converter and said flyback controller and operable for generating a plurality of power supplies based on said constant power voltage.

7. The controller of claim 1, further comprising:
a first comparator for comparing a first ramp signal with a first reference signal and generating a first output signal based on a result of said comparing;
a first-flip flop coupled to said first comparator for generating a control signal based on said first output signal and a first clock signal, wherein said control signal controls said constant power voltage;
a second comparator for comparing a second ramp signal with a second reference signal and generating a second output signal based on a result of said comparing; and
a second flip-flop coupled to said second comparator and said flyback converter for controlling said flyback converter based on said second output signal and second clock signal.

8. The controller of claim 1, wherein said flyback controller controls said flyback converter in response to a current sensing signal indicative of a current condition at a primary winding of said transformer.

9. The controller of claim 1, wherein said ramp signals comprise ramp signals that have a first frequency equal to a frequency of said first converter and ramp signals that have a second frequency equal to a frequency of said flyback controller, and wherein said plurality of clock signals comprise clock signals that have said first frequency and clock signals that have said second frequency.

10. The controller of claim 7, further comprising:
an OR gate coupled to said second flip-flop for receiving said second output signal and a current sensing signal.

11. The method of claim 2, wherein said auxiliary voltage is produced at a secondary side of said transformer.

12. The method of claim 2, further comprising:
comparing said first ramp signal with a first reference signal; and
controlling said constant power voltage based on said first clock signal and a result of said comparing.

13. The method of claim 2, further comprising:
comparing said second ramp signal with a second reference signal; and
controlling said output voltage of said converter based on said second clock signal and a result of said comparing.

14. The circuit of claim 3, wherein said first ramp signal has the same frequency as said first clock signal, and wherein said second ramp signal has the same frequency as said second clock signal.

* * * * *